May 31, 1927.  1,630,514
M. F. BAYER
CASTER MOUNTING
Filed Jan. 18, 1923  2 Sheets-Sheet 2
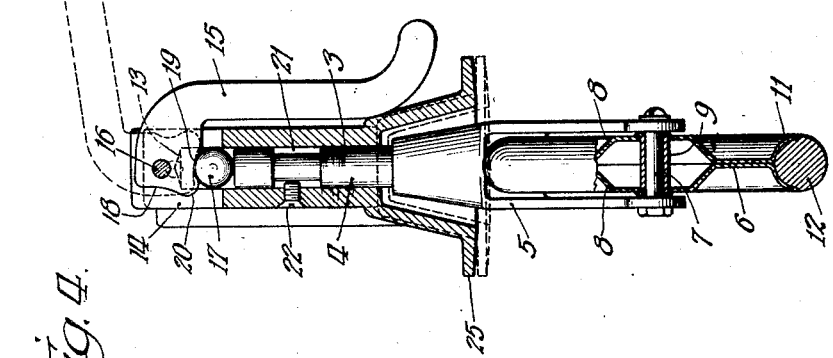
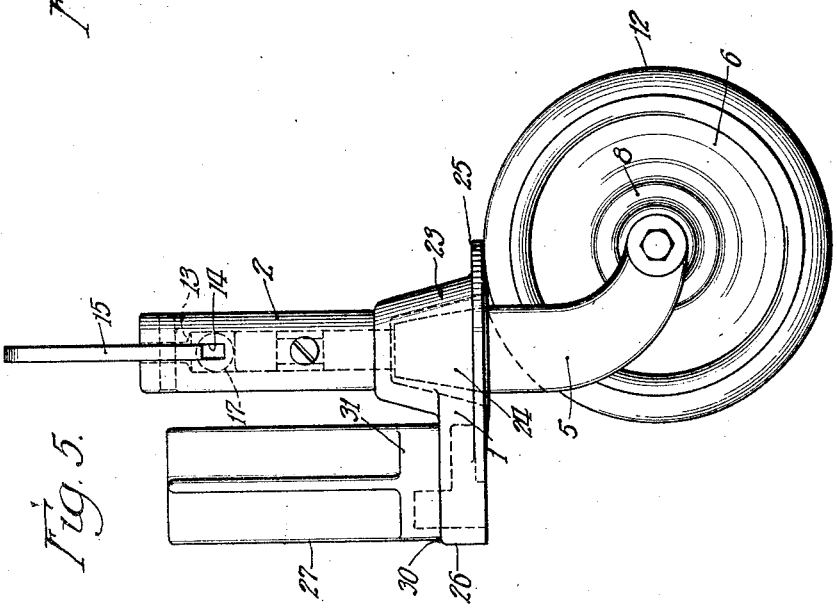
Inventor
Matthew F. Bayer
Fisher Toole Clapp + Soans
Attys.

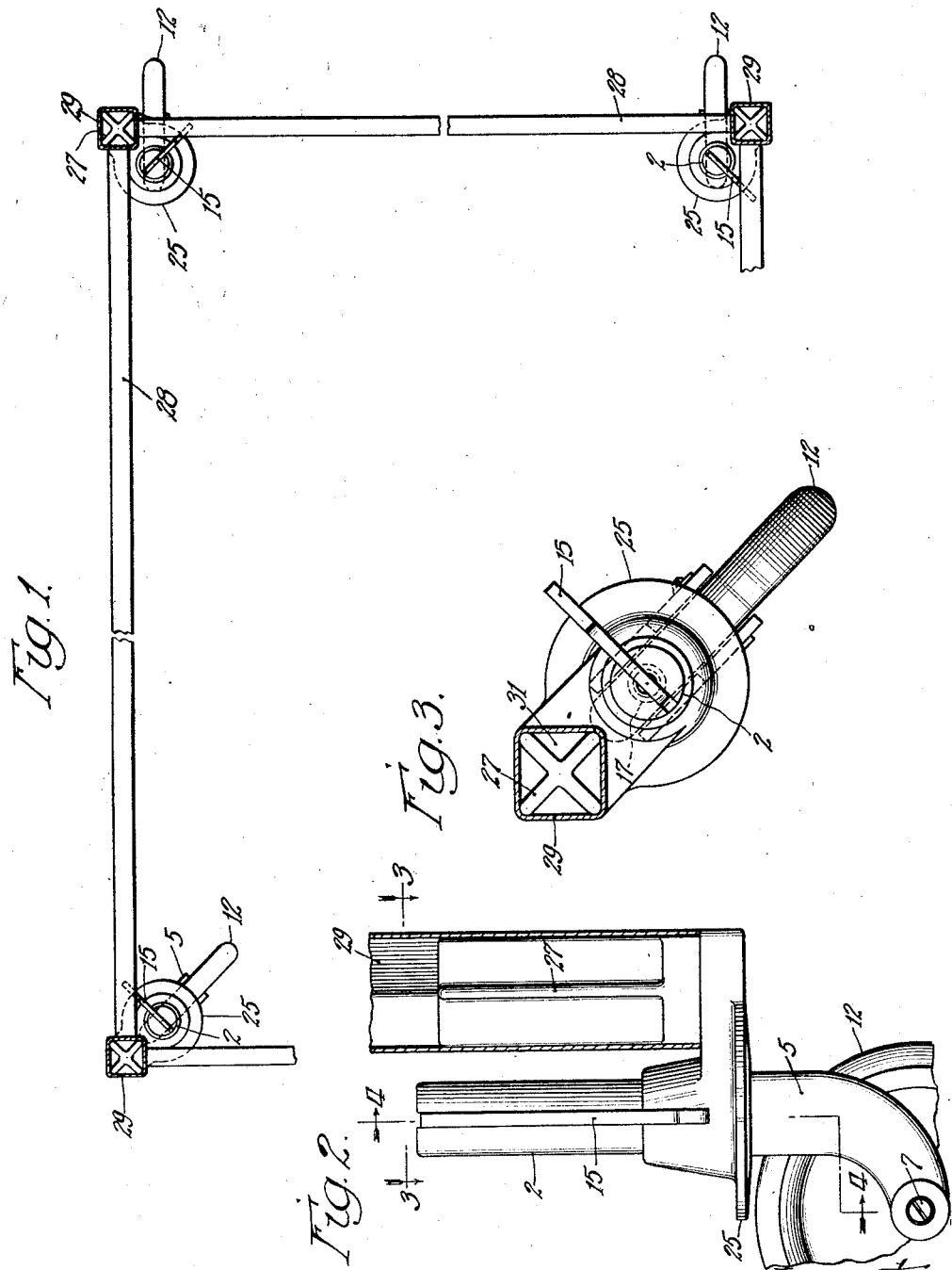

Patented May 31, 1927.

1,630,514

UNITED STATES PATENT OFFICE.

MATTHEW F. BAYER, OF KENOSHA, WISCONSIN, ASSIGNOR TO SIMMONS COMPANY, OF KENOSHA, WISCONSIN, A CORPORATION OF DELAWARE.

CASTER MOUNTING.

Application filed January 18, 1923. Serial No. 613,404.

My invention has reference to casters of the type used on furniture and relates more particularly to the manner of attaching the caster to the article to be supported and also to locking mechanism for holding the caster against rotation.

The principal objects of my invention are to provide an offset mounting for the caster; to improve the connection of the caster with the supported article; to construct the device so that the caster turns more freely; to provide improved means for locking the caster against turning movement; and in general, to provide an improved caster wheel mounting which is simple and inexpensive and having advantages not present in structures of this character heretofore provided.

On the drawings:

Fig. 1 is a top fragmentary view of a bed frame having casters mounted thereon in accordance with my invention;

Fig. 2 an enlarged side view of the caster structure with a portion of the post to which it is attached shown in section;

Fig. 3 a top view on the line 3—3 of Fig. 2;

Fig. 4 a view partly in section on the line 4—4 of Fig. 2;

Fig. 5 a side view showing the parts adjusted to lock the caster wheel against turning movement; and Fig. 6 a fragmentary view of the upper portion of the structure shown in Fig. 4, with the locking lever in the raised position.

Referring to the drawings, the numeral 1 indicates the main frame of the caster wheel mounting, which is formed at one side with an upright tubular housing 2, bored out as indicated at 3 to receive the stem 4 of the caster wheel bracket 5, which latter has a pair of spaced arms which are swung laterally in the usual manner and have the caster wheel 6 mounted on the spindle 7 which extends between the outer ends of said arms. The caster wheel in the present construction is composed of a pair of stamped plates 8 which are secured together at their centers by the ferrule 9 which forms the bearing to engage the spindle 7, and said plates are formed with peripheral curved flanges forming a semicircular seat around the wheel for a rubber tire 12.

The bore 3 in the housing 2 terminates below the top of the housing as indicated by the dotted lines at 13, and the upper end of the housing is slotted as indicated at 14, to receive the end of the lever 15 which is pivoted on the pin 16. A ball 17 is interposed in the bore 3 between the upper end of the stem 4 and the pivoted end of the lever 15, which latter has a cam action against the ball 17 for regulating the position or extent of insertion of the stem 4 in the housing 2. For this purpose the upper end of the lever 15 is formed with shallow recesses 18 and 19 a quarter turn distance part, the former of which is closer to the pivotal axis of the lever 15 so that when the lever 15 is in the position shown by dotted lines in Fig. 4, the recess 18 is brought above and engaged by the ball 17, thereby permitting the stem 4 to project into the housing 2 to a greater extent than when the lever 15 is in the full line position of Fig. 4 and the ball engaged with the recess 19. Inasmuch as the weight of the article supported on the caster holds the upper end of the lever 15 in engagement with the ball 17, the curvature of the seats 18 and 19 and the enlargement 20 therebetween serve to retain the lever 15 in either of the two positions of adjustment.

In order to retain the stem 4 in the bearing 2 and permit axial movement thereof, any suitable means may be employed, as for example, the annular groove 21 which is engaged by the inner end of the screw 22 secured in a threaded aperture in the wall of the housing 2, the groove 21 being of sufficient width to permit the required axial movement of the stem in the bearing for operation of the cam lever 15.

The bearing 2 is preferably formed at the lower end with a conical recess 23 and the upper end of the bracket 5 with a similar head entering said recess but suitably spaced therefrom so that the head 24 does not engage the recess 23 in either position of adjustment.

At the bottom of and extending around the recess 23 is an annular flange 25 which projects over the upper extremity of the tire 12 of the caster wheel as shown in Figs. 2 and 5, and in proximity thereto so that when the lever 15 is thrown to the position shown by dotted lines in Fig. 4, the housing 2 is forced downwardly on the stem by the weight of the article supported by the caster structure and the flange 25 brought into engagement with the tire 12 so as to lock the caster wheel against rotation on the spindle 7 and at the same time lock the stem 4 against turning movement in the housing 2. The under surface of this flange 25 is preferably beveled slightly as shown so as to be substantially tangential to the surface of the tire 12 with which it comes in contact, thereby insuring substantial engagement without injury to the tire.

In caster wheel structures, it is a common practice to mount same directly on the lower end of the leg or post of the article to be supported, thereby necessitating the formation of the lower end of the leg or post to receive the stem of the caster wheel or the housing thereof, and, furthermore, such a construction permits the caster wheel to project outwardly in some positions an undesirable distance at the side of the post or leg. In my construction, the caster wheel structure is offset laterally from the leg or post of the supported article so as to avoid the undesirable projection of the caster wheel at the outer side of the post or leg, and to simplify and facilitate the connection of the caster wheel structure with the supported article. To this end the bearing 2 is provided at its lower end with a lateral extension 26 for which the flange 25 serves as a reinforcement, and a shank 27 extends upwardly from this extension and is adapted to be secured in a socket or opening which is provided therefor in the lower end of the post or leg to which the caster is to be attached. The present form of the invention is shown in connection with a bed 28 having square corner posts 29, and the shank 27 is of web-form comprising four radial flanges, the outer edges of which are adapted to engage respectively in the four internal corners of the post 29 as shown in Fig. 3. This shank 27 is designed to fit snugly within the post so that it will be retained in place by frictional engagement when inserted and the extension 26 affords a shoulder 30 at the base of the shank against which the lower end of the post 29 abutts when the shank 27 is fully inserted in the post. The lower end of the shank 27 may be made solid as shown at 31 in Figs. 3 and 5, to insure sufficient strength at the juncture of the shank with the extension 26 and to reinforce the extreme lower edges of the post 29.

The shank 27 while shown herein as composed of four radial flanges to fit within a square post will be otherwise constructed to fit a post or socket of different form, and the housing 2 is usually positioned so that it projects inwardly under the supported article as shown in Fig. 1, so that the caster wheel does not swing outwardly an undesirable distance at the outer sides of a supported article.

The structure described is particularly convenient in connection with corner posts of a square cross section as the shank 27 fits in the post only in one of the four necessary positions of adjustments, and is therefore readily attached in the proper position.

With this construction, it will be observed that the weight of the supported article is carried entirely on the ball 17 (except when the flange 25 is dropped down into engagement with the tire 12) and this affords an antifriction bearing to permit the caster to swing freely around its vertical axis.

The lever 15 is normally positioned as shown in Fig. 4, so that the caster wheel is locked against movement. When it is desired to move the supported article, the lever 15 is thrown upwardly to the position shown in dotted lines in Fig. 4, the lower end of the lever being preferably outturned as shown in Fig. 4, so that it may be readily engaged by the foot to effect this operation, and when this lever is thrown upwardly, a slight elevation of the housing 2 occurs, thereby releasing the flange 25 from engagement with the caster wheel and permitting the caster wheel to turn freely on the spindle 7 and the stem 4 to turn freely in the housing 2.

While I have shown and described my invention in a preferred form, I am aware that various changes and modifications may be made without departing from the principles of my invention, the scope of which is to be determined by the appended claims.

I claim as my invention:

1. In a device of the class described, the combination of a bearing member having a bearing socket and a slotted upper end, the slot and socket communicating with each other, a caster wheel bracket having a stem journaled to rotate in said socket and also to slide axially therein, a caster wheel journaled in said bracket and a flange extending from said bearing member and arranged to tangentially engage the periphery of said wheel upon axial movement of said stem in said bearing member, a cam pivotally mounted in said slotted upper end for imparting said axial movement to said stem, anti-friction means interposed between the upper end of said stem and said cam, said cam having a pair of seats, each of which is adapted to engage said anti-friction means in one of the extremities of its operative movement, and means for retaining said stem in said socket.

2. In a device of the class described, the combination of a bearing member having a bearing socket and a slotted upper end, the slot and socket communicating with each other, a caster-wheel bracket having a stem journaled to rotate in said socket and also to slide axially therein, a caster wheel journaled in said bracket and a flange extending from said bearing member and arranged to tangentially engage the periphery of said wheel upon axial movement of said stem in said bearing member, a cam pivotally mounted in said slotted upper end for imparting said axial movement to said stem, anti-friction means interposed between the upper end of said stem and said cam, said cam having a pair of seats, each of which is adapted to engage said anti-friction means in one of the extremities of its operative movement, and means for mounting the device in offset relation to a supporting post or leg of an article of furniture or the like.

3. In a device of the class described, the combination of a supported article having a tubular leg or post, a member having a vertical extension inserted in the lower end of the tubular leg or post for securing said member thereto, an upwardly extending bearing on the member spaced laterally from said extension and located at the outer side of the post and divided and provided with a ball pocket at the upper end, a caster vertically swiveled in said bearing and having a stem engaging the ball in said pocket and a cam in the divided upper end of the upwardly extending bearing cooperating with the ball and caster to raise and lower the supported article.

4. The combination with an article having a supporting tubular leg or post of an angular cross section, of a caster mounting having an upwardly extending connector comprising a plurality of flanges having the outer extremities thereof engaged in the internal corners of the leg or post, and a caster vertically swiveled on said mounting at the exterior of said post.

5. In a device of the class described, a vertical bearing member having a divided upper end, a caster wheel bracket having a stem journaled to rotate in said bearing, and also to slide axially therein, said stem having an annular groove intermediate its ends, a caster wheel pivoted in said bracket, a substantially horizontal flange integral with and extending from the lower end of said bearing member and adapted to engage the periphery of said wheel upon axial movement of said stem in said bearing member, a cam lever pivotally mounted in said divided upper end for imparting said axial movement to said stem, a ball interposed between the upper end of said stem and the cam portion of said cam lever, seat portions in said cam adapted to engage said ball at each extremity of its operating movement, means for retaining said stem in said bearing comprising a pin secured in said bearing member and having a portion thereof projecting inwardly into said annular groove in said stem, and means for mounting said device in offset relation to the post or leg of an article having tubular posts or legs comprising a connector spaced laterally from said bearing member, and integrally connected thereto at its lower end, said connector being adapted to be inserted into the lower end of said tubular post.

MATTHEW F. BAYER.